Dec. 21, 1943.     H. A. MILLS     2,337,402
DRILL CHUCK
Filed Aug. 12, 1942
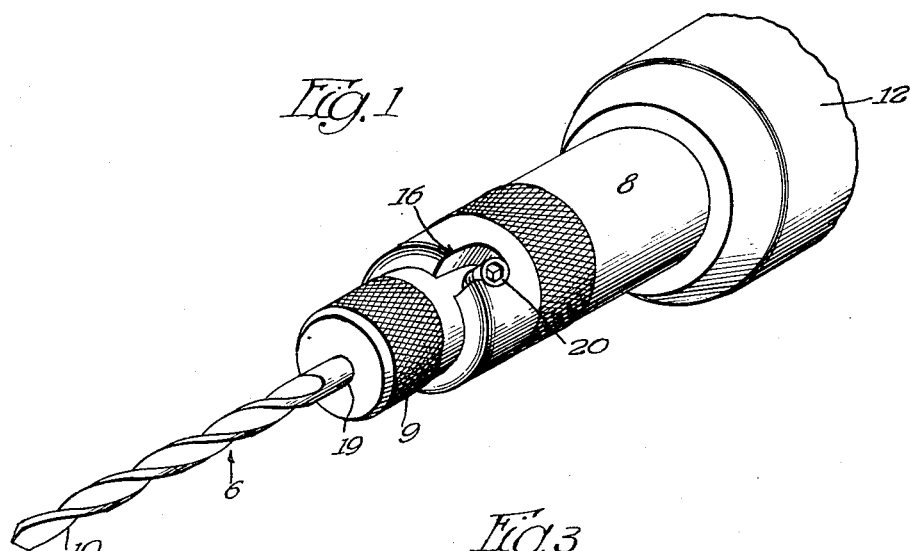
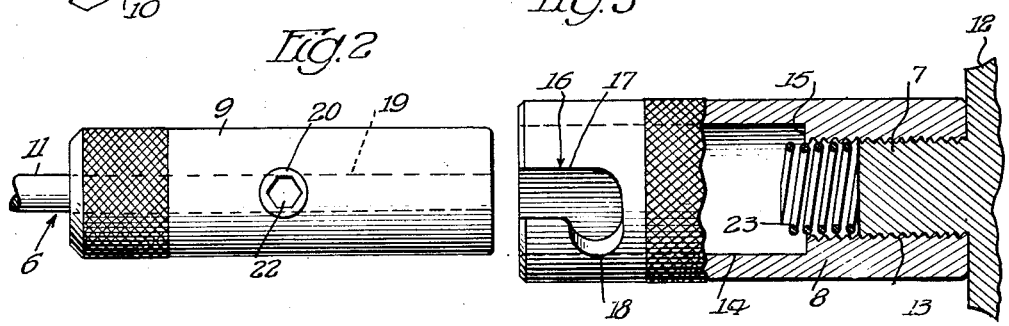
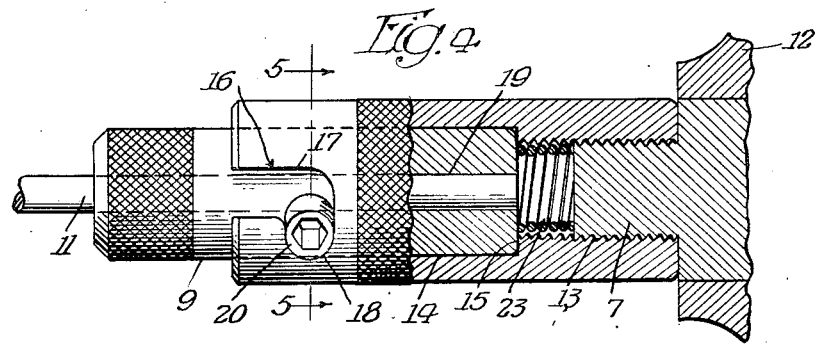
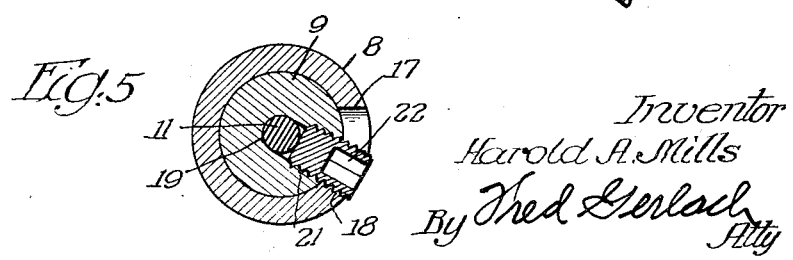
Inventor
Harold A. Mills
By Thed Gerlach
Atty Patented Dec. 21, 1943

2,337,402

UNITED STATES PATENT OFFICE 2,337,402

DRILL CHUCK

Harold A. Mills, Nashville, Tenn., assignor, by mesne assignments, to Consolidated Vultee Aircraft Corporation, a corporation of Delaware Application August 12, 1942, Serial No. 454,518

2 Claims. (Cl. 279—83)

The present invention relates generally to drill chucks. More particularly the invention relates to that type of drill chuck which is designed to couple a drill bit to a power driven shaft and as its principal parts comprises: (1) an elongated driving member which is provided at one end thereof with means for connection to the shaft and embodies at its other end a cylindrical, longitudinally extending socket; (2) a removable adaptor which has a longitudinal bore for the smooth or nonworking end of the drill bit and is shaped to fit within the socket in the driving member; and (3) a joint which serves releasably to connect the adaptor to, and for drive by, the driving member, consists of coacting or complemental parts on the adaptor and driving member, and is rendered operative when the adaptor is inserted into the socket and then turned in one direction relatively to the driving member, and inoperative when the adaptor is rotated in the opposite direction relatively to the driving member.

One object of the invention is to provide a drill chuck of this type which is an improvement upon, and has certain advantages over, previously designed chucks including that which is disclosed in, and forms the subject matter of, an application for United States Letters Patent filed by me on August 12, 1942, and serially numbered 454,517.

Another object of the invention is to provide a drill chuck of the type and character under consideration in which the joint for releasably connecting the adaptor to the driving member is of the bayonet variety and comprises an L-shaped notch in the socket equipped end of the driving member and a transversely extending protruding part on the adaptor.

A further object of the invention is to provide a drill chuck of the last mentioned character in which the transversely extending protruding part of the bayonet joint for releasably connecting the adaptor to the driving member is in the form of a set screw which extends through a radially extending internally threaded hole in the adaptor and serves, in addition to forming part of the drill joint, to hold the drill bit in place in the central longitudinally extending bore in the adaptor.

A still further object of the invention is to provide a drill chuck which is simple in design and construction, may be manufactured at a low and reasonable cost and is characterized by smallness of size and quick connection and removal of the adaptor with respect to the driving member.

Other objects of the invention and the various advantages and characteristics of the present drill chuck will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective of a drill chuck embodying the invention;

Figure 2 is a side view of the adaptor;

Figure 3 is a side view of the driving member, parts being broken away and other parts being shown in section for purposes of illustration;

Figure 4 is a side view showing the adaptor within the socket in the driving member and illustrating in detail the manner in which the L-shaped notch in the socket equipped end of the driving member and the set screw on the adaptor coact releasably to secure the adaptor and driving member in connected or driving relation; and Figure 5 is a transverse section taken on the line 5—5 of Figure 4 and showing the manner in which the set screw of the bayonet type joint serves additionally as a medium or instrumentality for holding the smooth end of the drill bit in the longitudinal bore in the adaptor.

The chuck which is shown in the drawing constitutes the preferred form or embodiment of the invention. It is designed primarily to connect a bit 6 for drive by a power driven shaft 7 and comprises as its principal parts an elongated driving member 8 and an adaptor 9. The bit which is shown in the drawing represents merely one form or type of bit with which the chuck may be used, and has a spiral-like cutting or operating end 10 and a smooth or non-working end 11. The shaft 8 is externally threaded and forms the driving element of an electric or pneumatic drill 12.

The driving member 8 is cylindrical and has at one end thereof an internally threaded bore 13 for the externally threaded shaft 7 of the drill 12. It is preferably formed of hardened cold rolled steel and has the central portion of the outer periphery or side face thereof knurled in order that it may be readily gripped. The bore 13 extends longitudinally of the driving member and is of substantially uniform diameter from one end thereof to the other. It is located in truly centered relation with the cylindrical periphery or side wall of the driving member and its depth corresponds to approximately one-third of the over-all length of the driving member. The internal screw thread with which the bore is provided extends from one end of the bore to the other. The driving member is connected to the shaft 7 by inserting the externally threaded end of the shaft into the bore 13 and then rotating the member relatively to the shaft in order to bring the thread on the shaft into engagement with the internal screw thread around the bore 13. In addition to the bore 13 the driving member is provided with a cylindrical socket 14. This socket extends longitudinally of the driving member and is of slightly greater diameter than the bore 13. It extends through the other end of the driving member and is in axial alignment and communication with the bore 13. The driving member is provided in the interior thereof with an annular shoulder 15 and this is located adjacent the inner ends of the bore 13 and the socket 14, and faces in the direction of the open or outer end of the socket. As shown in Figures 3 and 4, the socket 14 is of uniform diameter from end to end. The driving member embodies at its socket equipped end an L-shaped notch 16. This notch forms part of a bayonet joint or connection between the adaptor and the driving member and comprises an entrance forming portion 17 and a laterally extending seat forming portion 18. The entrance forming portion 17 of the notch extends longitudinally of the driving member and intersects and leads inwards from the adjacent end face of the driving member. It is straight and in addition it is of uniform width from one end thereof to the other. The seat forming portion 18 of the notch joins and communicates with the inner end of the entrance forming portion 17 and extends transversely or circumferentially of the driving member 8. The notch, as shown in Figure 5, extends completely through the portion of the driving member that surrounds and defines the socket 14.

The adaptor 9, like the driving member 8, is preferably formed of hardened cold rolled steel. It is substantially cylindrical and has a longitudinal centrally disposed bore 19 for the smooth end 11 of the drill bit 6. This bore extends from one end of the adaptor to the other and is of uniform diameter from one end thereof to the other. The diameter of the bore 19 is minutely more than the diameter of the smooth end of the drill bit in order that such end may be readily inserted into the bore in connection with assembly of the drill bit and adaptor. A set screw 20 is disposed in an internally threaded transversely extending hole 21 in the central portion of the adaptor and serves releasably to hold the drill bit in connected relation with the adaptor. The hole 21 intersects the bore 19 and extends or leads through the outer surface of the adaptor. The set screw 20 is approximately twice as long as the hole with the result that the outer end thereof is exposed and projects beyond the outer periphery or side surface of the adapter when the set screw is in its operative position wherein it serves to retain the drill bit and adaptor in connected relation. Said outer end of the set screw constitutes the other part of the bayonet joint for releasably securing the adaptor to the driving member and is provided with a polygonal socket 22 for receiving a wrench or other suitable tool in connection with turning of the set screw. When the set screw is tightened the inner end thereof is brought into engagement with the smooth end of the drill bit and serves to lock the bit to the adaptor and prevent axial displacement thereof in the bore 19. When the screw is loosened by reversely turning or rotating it by way of a wrench inserted within the polygonal socket 22 the inner end of the set screw moves away from the smooth end of the bit and thus frees the bit so that it may be removed for replacement or repair purposes. The diameter of the adaptor is minutely less than the diameter of the socket 14 in the driving member 8. The length of the adaptor is greater than the length of the socket. One end of the adaptor is knurled so that it may be readily gripped. The other end of the adaptor is adapted to be inserted into the socket 14 in connection with assembly of the adaptor and driving member. In assembling the adaptor with respect to the driving member the end opposite that which is knurled is inserted into the outer end of the socket and then the adaptor is shifted axially so as to bring the outer end of the set screw 20 into alignment with the entrance portion 17 of the L-shaped notch 16 in the socket equipped end of the driving member. After this operation the adaptor is shifted further into the socket until the outer end of the set screw passes through the entrance portion 17 of the notch and is aligned with the seat forming portion 18. Thereafter the adaptor is turned relatively to the driving member in order to bring the outer end of the set screw into the seat forming portion 18 of the notch. When the set screw is in seated relation with the seat forming portion 18 of the notch the adaptor and driving member are locked together against relative axial displacement. The seat forming portion of the notch in the outer end of the set screw constitutes a driving connection between the driving member and the adaptor when the set screw is in seated relation with said portion of the notch. The set screw is so positioned that when it is seated within the seat forming portion 18 of the notch the inner end of the adaptor is in abutment with the annular shoulder 15 at the inner end of the socket 14. By having the inner end of the adaptor abut against the shoulder 15 when the adaptor and driving member are in connected or assembled relation the shoulder prevents axial thrust or movement of the adaptor in the direction of the shaft 7 of the drill 12 and thus reduces stress on the set screw. The seat forming portion 18 of the notch 16 extends from the entrance forming portion 17 in a direction opposite to the direction in which the driving member 8 is driven by the drill shaft 7. If the driving member 8, as shown in Figure 1, is adapted to be driven in a counterclockwise direction the seat forming portion 18 of the notch 16 extends away from the inner end of the entrance forming portion 17 in a clockwise direction. When it is desired to uncouple or disconnect the adaptor 9 from the driving member 8 the adaptor is first rotated relatively to the driving member in such manner as to swing the outer end of the set screw 20 out of seated relation with the seat forming portion 18 of the notch and into the inner end of the entrance forming portion 17. This frees the adaptor so that the latter may be removed from the driving member merely by sliding it away from, and out of, the socket 14.

In addition to the driving member 8 and the adaptor 9 the chuck comprises a helical spring 23. This spring is disposed within the driving member and extends longitudinally of the latter. One end of the spring is mounted in the inner end of the bore 13 and is held in place by being interlocked with the adjacent portion of the internal screw thread, as shown in the drawing. The other end of the spring projects normally into the inner end of the socket 14, and is adapted to abut against the adaptor 9, as shown in Figure 4. The spring is of such length that it is placed under compression when the adaptor is inserted into and locked with the driving member. The spring has a twofold purpose in that it serves yieldingly to hold the adaptor in connected relation with the driving member and also to eject the adaptor in connection with withdrawal from the driving member. When the adaptor is in place the spring bears against the adjacent adaptor end and subjects the adaptor to an outward pressure which tends to hold the outer end of the set screw 20 of the adaptor in firm engagement or seated relation with the seat forming portion 18 of the notch 16. When the adaptor is turned so as to bring the outer end of the set screw out of seated relation with said portion of the notch and into the entrance forming portion 17 in connection with removal of the adaptor from the driving member the spring, due to its pressure on the adaptor, operates to eject the adaptor from the driving member.

When the chuck is to be used the smooth end 11 of the bit 6 is inserted into the bore 19 of the adaptor 9 and is then locked in place by tightening the set screw 20. After connection of the bit to the adaptor the adaptor is inserted into the socket 14 in the driving member and it is then turned so as to bring the outer end of the set screw into sealed relation with the seat forming portion 18 of the notch. This step or operation results in the spring 23 being placed under compression and the adaptor being locked in connected relation with the driving member. When the adaptor is in place the spring tends to urge the adaptor out of the socket and thus maintains the set screw in locked or seated relation with the seat forming portion 18 of the notch. During use of the chuck any axial thrust on the adaptor in the direction of the driving member is borne by the annular shoulder 15 between the adjacent ends of the bore and socket in the driving member. When it is desired to remove the adaptor 9 and provide for the use of another adaptor having a drill bit of different size the adaptor is rotated reversely relatively to the driving member 8 in order to bring the outer end of the set screw 20 out of seated relation with the seat forming portion 18 of the notch 16. As soon as the adaptor is properly rotated the compression spring 23 operates automatically to eject the adaptor 9 from the socket 14 in the driving member.

The herein described chuck is simple in design and hence may be produced at a low and reasonable cost. It is especially adapted for high production operations where it is necessary frequently to change drill bits. In addition, it is characterized by the fact that the adaptor may be applied to, and removed from, the driving member with facility, and the over-all dimensions further are so small that the unit as a whole may be used in ordinarily inaccessible places.

Whereas the chuck has been described as being primarily adapted for coupling a drill bit to a power driven shaft it is to be understood that it may be used for coupling other tools or other types of bits. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. As a new article of manufacture, a chuck adapted to couple a bit to a power driven shaft and comprising an elongated driving member having at one end thereof a longitudinal bore for receiving the shaft and means for connecting the member to, and for drive by, said shaft and embodying at its other end an open ended cylindrical socket axially aligned and communicating with, and of greater diameter than, the bore, and in addition an L-shaped notch adjacent and communicating with the outer end of the socket, a removable cylindrical adaptor having a longitudinal centrally disposed bore for receiving the bit and a transverse set screw for releasably holding the bit in said bore, and adapted to have one end thereof inserted fully into the socket so that it abuts against the part of the driving member that defines the inner end of said socket, said set screw having the outer end thereof projecting beyond the adjacent surface portion of the adaptor, and being arranged and adapted to have its outer end enter and become interlocked with the notch when said one end of the adaptor is inserted into the socket and then turned in one direction relatively to the driving member, and a helical compression type spring having one end thereof fitting and secured within the inner end of the bore in said one end of the driving member and its other end projecting normally into the inner end of the socket, and adapted when said one end of the adaptor is inserted fully into the socket to be compressed into the inner end of the last mentioned bore into a position wherein it serves yieldingly to hold the outer end of the set screw in interlocked relation with the notch.

2. An a new article of manufacture, a chuck adapted to couple a bit to an externally threaded power driven shaft and comprising an elongated driving member having at one end thereof a longitudinal bore with an internal screw thread extending from one end thereof to the other and adapted to connect the shaft to, and for drive by, the shaft, and embodying at its other end an open ended cylindrical socket axially aligned and communicating with, and of greater diameter than, the bore and in addition an L-shaped notch adjacent and communicating with the outer end of the socket, a removable cylindrical adaptor having a longitudinal centrally disposed bore for receiving the bit and a transverse set screw for releasably holding the bit in such bore, and adapted to have one end thereof inserted into the socket, said set screw having the outer end thereof projecting beyond the adjacent surface portion of the adaptor, and being arranged and adapted to have its outer end enter and become interlocked with the notch when said one end of the adaptor is inserted into the socket and then turned in one direction relatively to the driving member, and a helical compression type spring having one end thereof fitting within and interlocked with the inner end of the internally threaded bore in said one end of the driving member and its other end projecting normally into the inner end of the socket, and adapted when said one end of the adaptor is inserted into place in the socket to be compressed into a position wherein it serves yieldingly to hold the outer end of the set screw in interlocked relation with the notch.

HAROLD A. MILLS.